United States Patent
Won et al.

(10) Patent No.: US 7,350,283 B2
(45) Date of Patent: Apr. 1, 2008

(54) METHOD FOR MAKING ROTOR FOR PERMANENT MAGNET ELECTRIC MACHINE

(75) Inventors: Bumsuk Won, Avon, CT (US); Russel H. Marvin, Goshen, CT (US); Gary Peresada, Torrington, CT (US)

(73) Assignee: The Bergquist Torrington Company, Torrington, CT (US)

( * ) Notice: Subject to any disclaimer, the term of this patent is extended or adjusted under 35 U.S.C. 154(b) by 366 days.

(21) Appl. No.: 10/854,447

(22) Filed: May 26, 2004

(65) Prior Publication Data

US 2005/0071985 A1    Apr. 7, 2005

Related U.S. Application Data

(60) Provisional application No. 60/508,413, filed on Oct. 2, 2003.

(51) Int. Cl.
*H02K 15/02* (2006.01)
*H02K 15/10* (2006.01)

(52) U.S. Cl. ............... 29/598; 29/423; 29/455.1; 29/596; 29/608; 310/43; 310/74; 310/89; 310/156.05; 310/156.12

(58) Field of Classification Search ............ 29/598, 29/423, 455.1, 596, 608; 310/43, 74, 89, 310/156.05, 156.12
See application file for complete search history.

(56) References Cited

U.S. PATENT DOCUMENTS

| | | | | |
|---|---|---|---|---|
| 5,907,206 | A * | 5/1999 | Shiga et al. | 310/156.05 |
| 6,998,748 | B2 * | 2/2006 | Yeh et al. | 310/156.12 |

* cited by examiner

*Primary Examiner*—Tim Phan
(74) *Attorney, Agent, or Firm*—Haugen Law Firm PLLP

(57) ABSTRACT

A method for making a rotor for a permanent magnet electric motor comprising the steps of providing an annular permanent magnet and an annular back-up member. Affixing the magnet to the inner surface of the back-up member in an un-magnetized condition and overmolding both in an injection molding process while controlling the flow of the molten plastic so as to cause the plastic to engage the opposite sides of the magnet at substantially the same time resulting in a knit line intermediate the magnet sides on the inner surface of the magnet. Magnetizing the magnet.

11 Claims, 2 Drawing Sheets

METHOD FOR MAKING ROTOR FOR PERMANENT MAGNET ELECTRIC MACHINE

RELATED APPLICATION

Provisional application No. 60/508,413, titled "Overmolded flexible magnet" filed Oct. 2, 2003, inventors Bumsuk Won, Russel H. Marvin, Gary Peresada, incorporated herein by reference.

BACKGROUND OF THE INVENTION

Various techniques employed in attaching permanent magnets to annular back-up members in rotor assemblies for permanent magnet motors and other permanent magnet machines have been satisfactory in general but not completely without problems.

It is the general object of the present invention to provide an improved method of making a rotor of this type wherein the method steps are simple and direct and yet result in a rotor which is exceptional in overall quality, exhibits the highest degree of structural integrity, and provides excellent operating characteristics.

SUMMARY OF THE INVENTION

In fulfillment of the aforementioned object and in accordance with the present invention, the method of the invention comprises the steps of providing a permanent magnet, preferably of the flexible type, in an annular configuration and in an un-magnetized condition and providing an annular back-up member adapted to support the magnet on its inner surface and to serve with the magnet affixed thereto as a rotor in a permanent magnet electric machine. The permanent magnet is affixed to the inner surface of the back-up member in the desired position and the entire assembly is then over-molded in an injection molding operation so that the magnet and back-up member are substantially completely embedded in the plastic. The magnet is then magnetized in one or more segments with the desired number of poles.

The reason for the preference for a flexible magnet resides in the comparative ease and efficiency with which a one-piece flexible magnet can be assembled with the back-up member and temporarily affixed thereto. Conventional multiple magnet segments of metallic or ceramic construction also benefit substantially from the method of the invention but are considerably more difficult to arrange in the desired annular configuration and affix to the inner surface of the back-up member. This of course results in a loss of time and efficiency in the overall method.

A further advantage of the method resides in the ability to mold an electric machine, for example a permanent magnet electric motor, simultaneously and integrally with a rotatable device, for example a moving device such as a fan or impeller.

Plastic injection molding is conventionally carried out at high temperatures and at thousands of pounds of pressure per square inch. Thus, the molds should preferably be designed, with dams or otherwise, to provide for control of the flow rates of the molten plastic in two paths respectively toward the outer surface of the back-up member and the inner surface of the magnet such that the plastic reaches the opposite side edges of the magnet substantially simultaneously and the two flows then join each other to form a knit line at an intermediate location on the inner face of the magnet. Inadvertent or accidental dislodgment of the magnet during molding is thus minimized.

In addition to the foregoing, the back-up member may be designed with an annular shoulder which engages and secures the magnet in position along one side edge and the mold may have a provision for a second annular shoulder in the resulting plastic configuration opposing the first on the opposite side edge of the magnet.

Finally, it should be noted that the method of the invention is readily adaptable to configurations other than the rotor described above. Various stationary or other flat or curved assemblies of permanent magnets and their support members also benefit from the method with proper mold design providing properly timed engagement of molten plastic with side edges of the magnet and intermediate knit lines on relatively thin sections of plastic adjacent the magnet surface.

DESCRIPTION OF PREFERRED EMBODIMENTS

Figure 1:
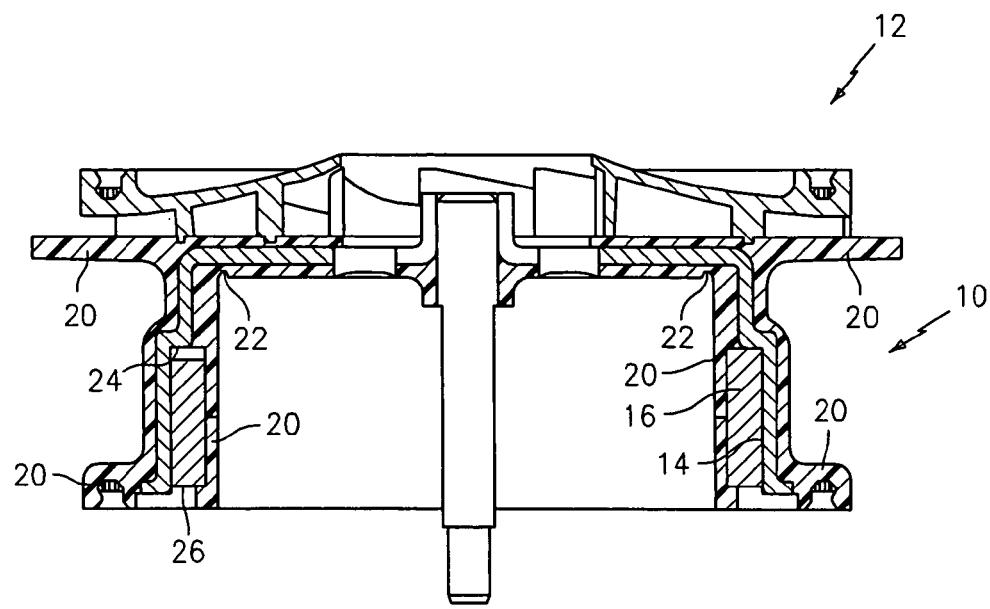
FIG. 1 is a cross sectional view through a rotor constructed in accordance with the method of the present invention.
Figure 2:
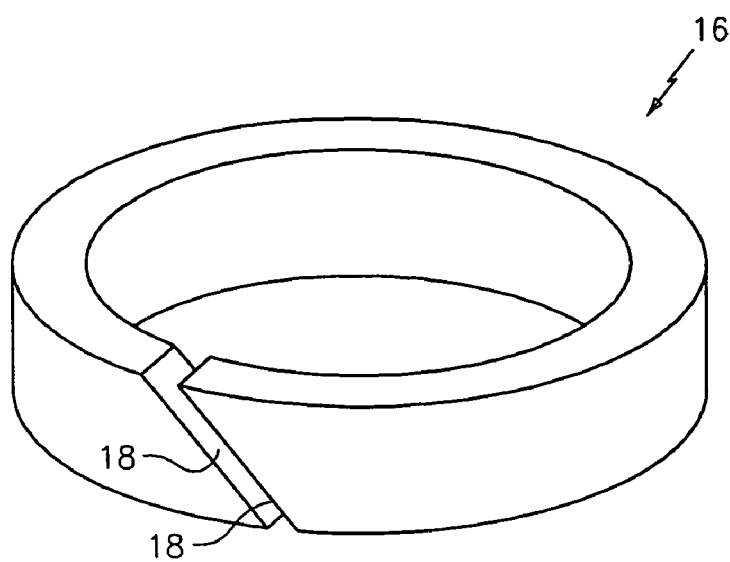
FIG. 2 is a perspective view of a flexible magnet, which may form a part of the rotor of the present method.
Figure 3:
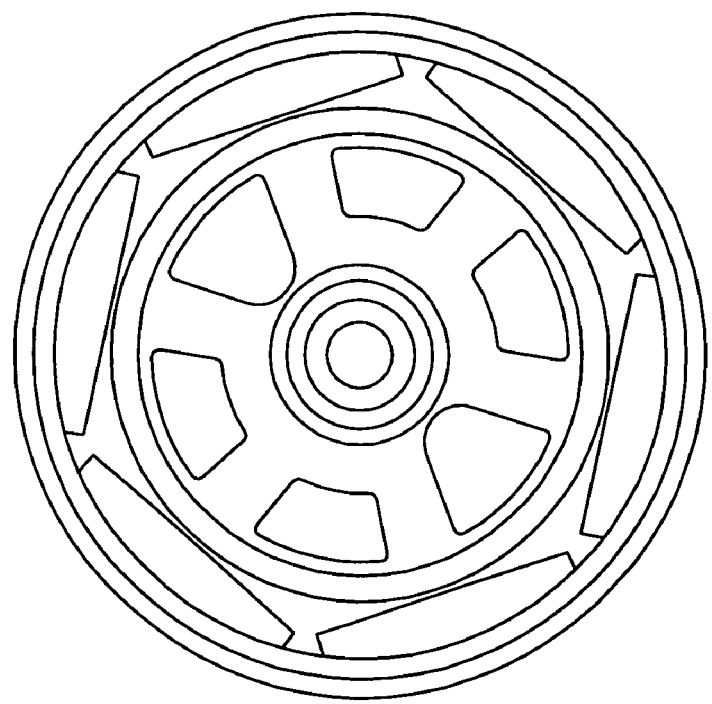
FIG. 3 is a sectional view through a rotor formed with an annular series of permanent magnet segments.

Referring particularly to FIG. 1, a rotor indicated generally at 10 is formed integrally with an air impeller indicated generally at 12. The rotor 10 forms a part of a permanent magnet electric machine, a permanent magnet electric motor as shown, and cooperates with a stator, not shown, disposed radially therewithin in a conventional inside-out arrangement. An annular back-up member 14, which may be conventional and of metallic construction, forms a part of the rotor 10 and has affixed thereto and on its inner surface an annular permanent magnet 16. The magnet 16 may be of one-piece flexible construction as illustrated in FIG. 2, or a multiple segment metallic or ceramic magnet arrangement as illustrated FIG. 3 may be employed. When the one piece flexible construction is used, opposite ends of the magnet are preferably inclined as shown in FIG. 2 at 18,18 to provide for an overlapping condition which facilitates assembly of the magnet with the back-up member with the magnet end surfaces in engagement.

In accordance with the method of the invention, and with either type of permanent magnet, the magnet or magnet segments are preferably temporarily affixed to the inner surface of the back-up member 14 in the desired position with the magnet or magnets in an un-magnetized condition. The magnet and back-up member assemblies are then over-molded in a conventional plastic injection molding process so that the two parts are substantially completely embedded in the plastic. The FIG. 1 structure results with additional portions of the rotor also embedded in plastic 20 and with the air impeller 12 molded simultaneously and integrally with the rotor. The magnet or magnets are then magnetized in one or more segments with the desired number of poles to complete the rotor.

As mentioned above, plastic injection molding is conventionally carried out at high temperatures and at thousands of pounds of pressure per square inch. Thus, mold design should provide for control of flow rates of molten plastic in two paths respectively toward the outer surface of the back-up member and the inner surface of the permanent magnet such that the plastic reaches the opposite side edges of the magnet substantially simultaneously with the two flows subsequently joining each other to form a knit line at an intermediate location on the inner surface of the magnet. A conventional means of flow control in the form of a dam as at 22 may be employed to inhibit flow toward the inner surface of the magnet.

Additionally, and to insure precise location of the magnet relative to the back-up member, the said member may be designed with an annular shoulder 24 which engages and secures the magnet along one side edge. A similar annular shoulder 26 engaging the magnet along its opposite side edge may also be provided in designing the mold.

Finally, the adaptability of the method of the invention to other configurations of magnet and support members should be considered. A first form of magnet-support member assembly in FIG. 4 includes simple flat flexible magnet 28 and a support member 30 of similar configuration. The magnet and support member are embedded in plastic 32 with a dam illustrated at 34 for control of the flow path adjacent the face of the magnet resulting in engagement of the two flows with the opposite side edges at substantially the same time and the desired knit line intermediate the sides of the magnet at 36.

Figures 4, 5:
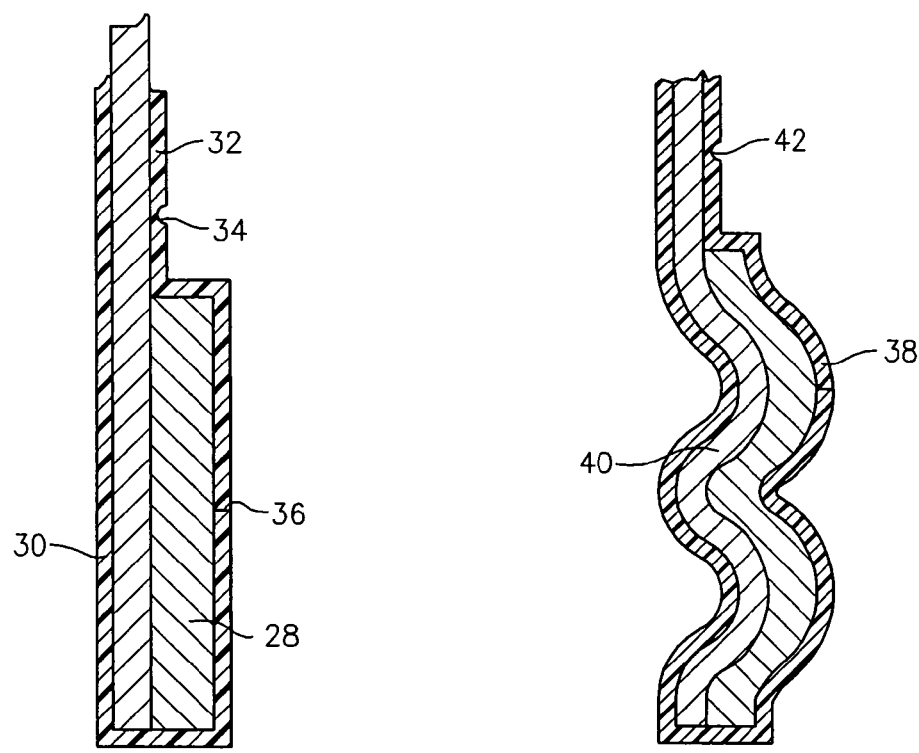
FIG. 4 is a sectional view through a stationary flat permanent magnet and support member assembly produced in accordance with the method of the present invention.
FIG. 5 is a sectional view through a stationary curved permanent magnet and support member assembly produced by the method of the invention.

In FIG. 5 a curved flexible magnet 38 and similarly shaped support member 40 are efficiently molded with the aid of a dam 42 restricting flow toward the face of the magnet as above.

The invention claimed is:

1. A method for making a rotor for a permanent magnet electric machine comprising the steps of providing a permanent magnet in an annular configuration and in an un-magnetized condition, providing an annular back-up member for the permanent magnet adapted to receive the magnet on its inner surface and to serve with the magnet affixed thereto as a rotor in an electric machine, affixing the permanent magnet to the back-up member in the desired position, over-molding the assembled magnet and back-up member in an injection molding operation so that the magnet and back-up member are substantially completely embedded in the plastic with the inner side and at least one end of the magnet completely covered by plastic, and magnetizing the permanent magnet in one or more sections.

2. The method for making a rotor for a permanent magnet electric machine as set forth in claim 1 wherein the electric machine takes the form of a permanent magnet electric motor.

3. The method for making a rotor for a permanent magnet electric machine as set forth in claim 1 wherein the permanent magnet takes the form of a one piece flexible magnet formed in an annular configuration.

4. The method for making a rotor for a permanent magnet electric machine as set forth in claim 3 wherein opposite ends of the magnet are inclined to provide for an overlapping inter-engagement of the same.

5. The method for making a rotor for a permanent magnet electric machine as set forth in claim 3 wherein the mold is designed for the flow of molten plastic both along an inner surface of the permanent magnet and an outer surface of the back-up member opposite the permanent magnet, and wherein the mold design provides for relative rates of flow toward the outer surface of the back-up member and the inner surface of the magnet resulting in the molten plastic reaching the opposite side edges of the magnet substantially simultaneously and then joining each other to form a knit line at an intermediate location on the inner surface of the magnet.

6. The method for making a rotor for a permanent magnet electric machine as set forth in claim 5 wherein a dam is provided in the mold to restrict the flow of molten plastic toward the inner surface of said magnet.

7. The method for making a permanent magnet rotor as set forth in claim 5 wherein the mold is designed to provide for substantially complete coverage of both ends of the magnet and a thin but complete coverage of the inner side of the magnet by the terminal portions of the respective flow paths as they approach the knit line, the said terminal flow portions being at the lowest possible plastic temperature to avoid damage to the flexible magnet.

8. The method for making a rotor for a permanent magnet electric machine as set forth in claim 1 wherein the permanent magnet takes the form of a plurality of permanent magnet segments arranged in slightly spaced end-to-end relationship and in an annular configuration.

9. The method for making a rotor for a permanent magnet electric machine as set forth in claim 1 wherein the back-up member is formed integrally during the molding step with a rotatable member connected with and rotating therewith.

10. The method for making a rotor for a permanent magnet electric machine as set forth in claim 9 wherein the machine is a motor and the rotatable member takes the form of an air moving device driven thereby.

11. The method for making a rotor for a permanent magnet electric machine as set forth in claim 1 wherein the back-up member is designed with an annular shoulder which engages and secures the magnet in position along one side edge, and wherein the mold is designed to provide a resulting second annular shoulder at the opposite side of the magnet to engage and secure the magnet in position along its opposite side edge.

\* \* \* \* \*